(12) United States Patent
Chen et al.

(10) Patent No.: US 8,139,567 B2
(45) Date of Patent: Mar. 20, 2012

(54) TRANSCEIVING APPARATUS AND DATA PROCESSING SYSTEM FOR COMMUNICATION BASE STATIONS

(75) Inventors: Jian Wen Chen, Beijing (CN); Yonghua Lin, Beijing (CN); Ravinder Kumar Sabhikhi, Research Triangle Park, NC (US); Qing Wang, Beijing (CN); Zhen Bo Zhu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 474 days.

(21) Appl. No.: 12/473,645

(22) Filed: May 28, 2009

(65) Prior Publication Data

US 2009/0296636 A1 Dec. 3, 2009

(30) Foreign Application Priority Data

May 29, 2008 (CN) .......................... 2008 1 0108872

(51) Int. Cl.
 *H04L 12/66* (2006.01)
(52) U.S. Cl. .................................................... 370/356
(58) Field of Classification Search .................. None
 See application file for complete search history.

(56) References Cited

U.S. PATENT DOCUMENTS

| | | | |
|---|---|---|---|
| 7,031,755 B2 | 4/2006 | Li | |
| 7,315,903 B1 * | 1/2008 | Bowden | 709/250 |
| 7,483,370 B1 * | 1/2009 | Dayal et al. | 370/219 |
| 7,903,638 B2 * | 3/2011 | Liu et al. | 370/352 |
| 2005/0027789 A1 | 2/2005 | Luo | |

* cited by examiner

*Primary Examiner* — Raj Jain
(74) *Attorney, Agent, or Firm* — Vazken Alexanian (57) ABSTRACT

A base station apparatus adaptive for antenna arrays including at least one radio frequency (RF) header module, at least one data processing apparatus, and transceiving apparatus for transceiving data between the at least one radio frequency (RF) header module and the at least one data processing apparatus. The transceiving apparatus includes an uplink module to group data received by the RF header module according to grouping configuration information, and to transfer the grouped data to the data processing apparatus; and a downlink module to degroup the data from the data processing apparatus according to the grouping configuration information, and to transfer the degrouped data to the RF header module. Also provided are methods of receiving and sending data, and a computer readable article of manufacture tangibly embodying computer readable instructions for executing a computer implemented method of sending and receiving data for a base station.

13 Claims, 9 Drawing Sheets

| FIG. 3A | FIG. 3B |

TRANSCEIVING APPARATUS AND DATA PROCESSING SYSTEM FOR COMMUNICATION BASE STATIONS

CROSS-REFERENCE TO RELATED APPLICATION

This application claims priority under 35 U.S.C. §119 from Chinese Patent Application No. 200810108872.4 filed on May 29, 2008, the entire contents of which are incorporated herein by reference.

BACKGROUND OF THE INVENTION

1. Field of the Invention

The present invention is related to a communication base station, and in particular to a radio frequency communication base station adaptive for antenna arrays, a transceiving apparatus, a data processing system, and methods of receiving and sending data for the base station.

2. Description of Related Art

Requirements for the next generation mobile communication system have increased when compared to today's communication system. The next generation mobile communication system must be able to provide a larger variety of interactive multimedia services, such as movies, games, television broadcasts, on-line transactions and voice services, with high speed and high quality via the converged network of wired and wireless infrastructures. Such various multimedia and data services require a communications base station not only with high throughput, but also with high computation capability to handle large numbers of streams or packets simultaneously. At the same time, the base station needs to be consistent with multiple standards, and to meet the requirements of various application services. Therefore, high computation capability and enough flexibility and scalability are the trend and the challenge for communications base stations for the next generation mobile system.

Figure 1:
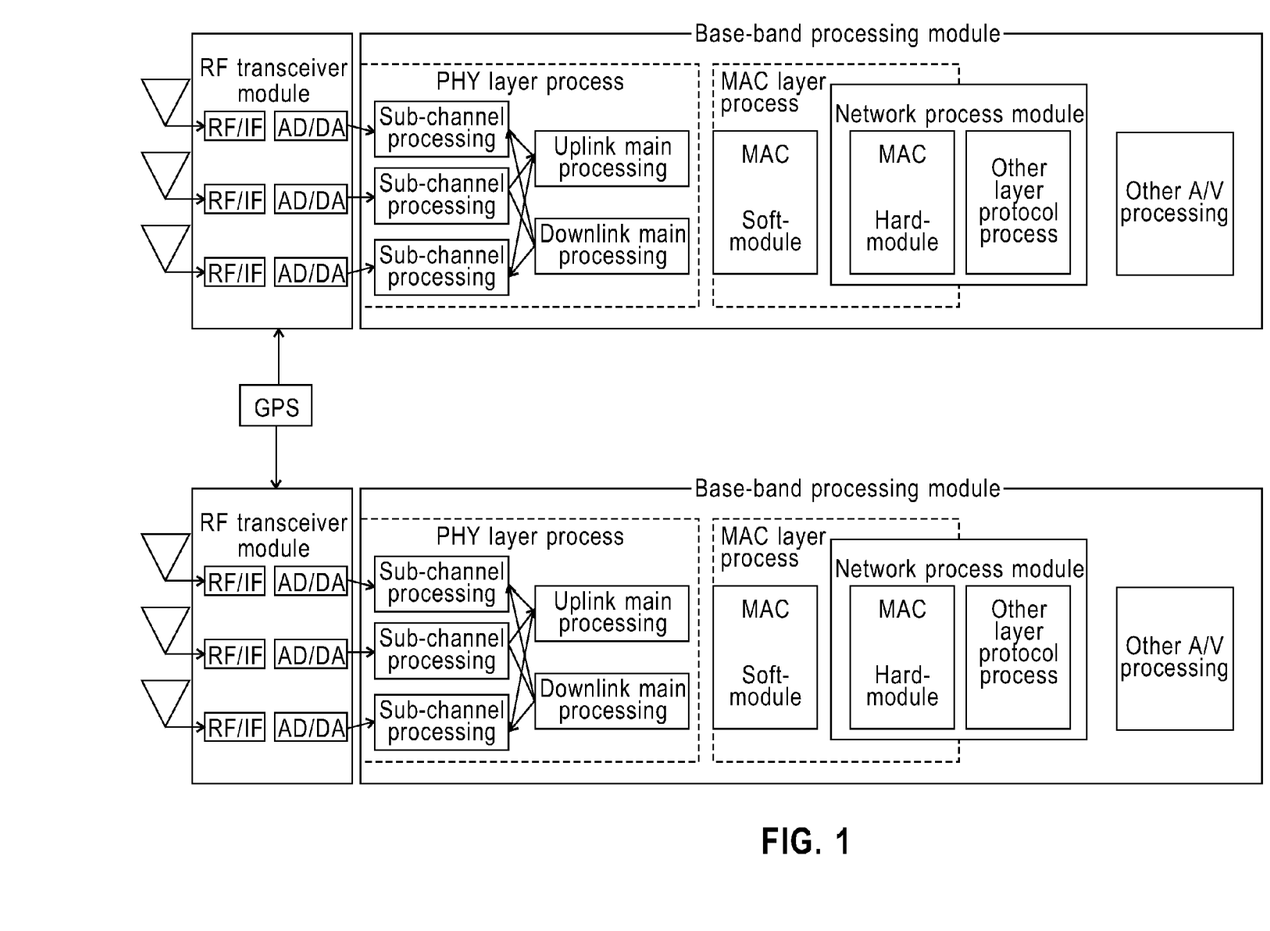
FIG. 1 illustrates the architecture of an existing communication base station.

FIG. 1 shows the architecture of today's base station. As shown in FIG. 1, the base-band processing system of the traditional base station includes a variety of proprietary designs implemented by semiconductor hardware in the form of a DSP (digital signal processor), a FPGA (field-programmable gate array), and an ASIC (application-specific integrated circuit), which result in different platforms serving for different standards, such as GSM (Global System for Mobile communications) and WCDMA (Wideband Code Division Multiple Access), allowing no flexibility and scalability of the whole system. In FIG. 1, the PHY layer is the physical layer, the MAC layer is the Media Access Control Layer. Even within one standard, to support different coverage and application features, the hardware platforms must also be different. In order to meet different standards and accommodate other different application characteristics, in most cases, proprietary chips of different models or quantities are required, thus necessitating the redesigning and redeveloping of the hardware platform and resulting in a high cost of time and expense. Hence, in a base station based on proprietary hardware design, the development and management cost for both hardware and software will be heavy for operators as well as for telecom equipment manufacturers.

Considering these issues for base stations built on traditional architecture, the idea of open architecture based base stations has been proposed in recent years. Under the implementation and popularization of multi-core technology, the computation performance of IT computing platforms based on general purpose multi-core processors is being increased rapidly. So as to pursue better flexibility and scalability, the industry has started to consider adopting general IT computing platforms in networking areas, thus replacing the traditional proprietary design, especially for base stations in mobile communications. Accordingly, there are some new implementations using IT servers in base station design. They can use the servers to support different kinds of standards, e.g., GSM, CDMA, and use the servers to support different numbers of sectors or cells.

From another point of view, the concept of an antenna array (a group of antenna elements) with a base station is widely used in the new generation wireless standards, e.g., 802.11n of the 802.11 series, 802.16e, TD-SCDMA (Time Division-Synchronous Code Division Multiple Access), and LTE (Long Term Evolution). The size of the array will highly influence the throughput, coverage and system SNR (signal-to-noise ratio) of the base station. For instance, to cover a micro cell, a 2-element antenna array may be enough, but for a macro cell, a 4-element antenna array will be required. Further, different algorithms will require different numbers of antenna elements in the array. For example, 802.11n applying MIMO (multiple-input and multiple-output) technology will require an antenna array with 2 or 4 elements, while TD-SCDMA (Time Division-Synchronous Code Division Multiple Access) using smart antenna techniques will need an array with at least 8 elements.

Figure 2A:
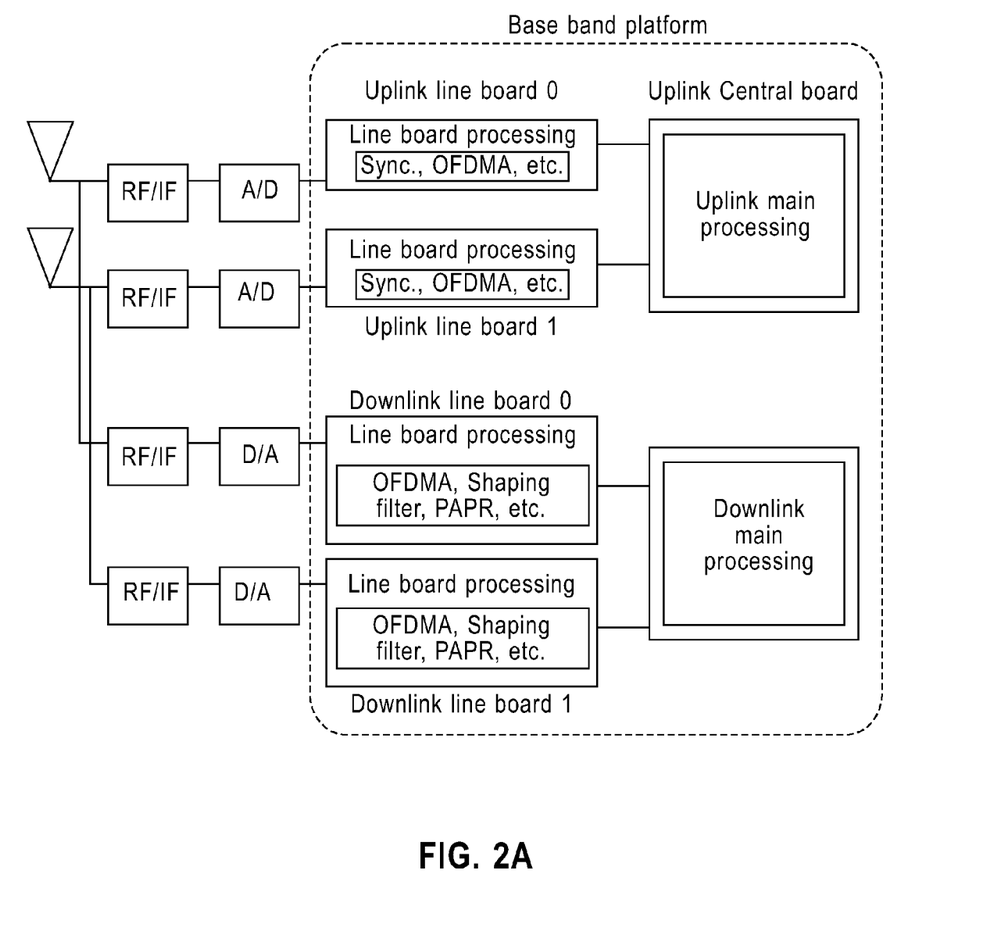
FIG. 2 illustrates the modifications to a base band processing platform of a traditional base station performed according to an increase in the size of antenna arrays.

For traditional base station architecture composed of proprietary designs, when the size of the antenna array changes, the base band processing platform must be re-designed to accompany the changes of the antenna array. FIG. 2 illustrates the changes carried out to a base band processing platform of a traditional base station accompanying an increase in size of the antenna array. As shown in FIG. 2(a), the antenna array includes two antennas, the first antenna connected to board 0 and the second antenna connected to board 1. Accordingly, sub-channel processing hardware modules are needed in the base band processing platform corresponding to the uplink and downlink data of each antenna, i.e., an uplink sub-channel hardware module 0 to process the uplink data of the first antenna, an uplink sub-channel hardware module 1 to process the uplink data of the second antenna, a downlink sub-channel hardware module 0 to process the downlink data of the first antenna, and a downlink sub-channel hardware module 1 to process the downlink data of the second antenna. Furthermore, an uplink central processing hardware module and a downlink central processing hardware module are needed in the base band processing platform for the central main processing of uplink data and downlink data, respectively.

Figure 2B:
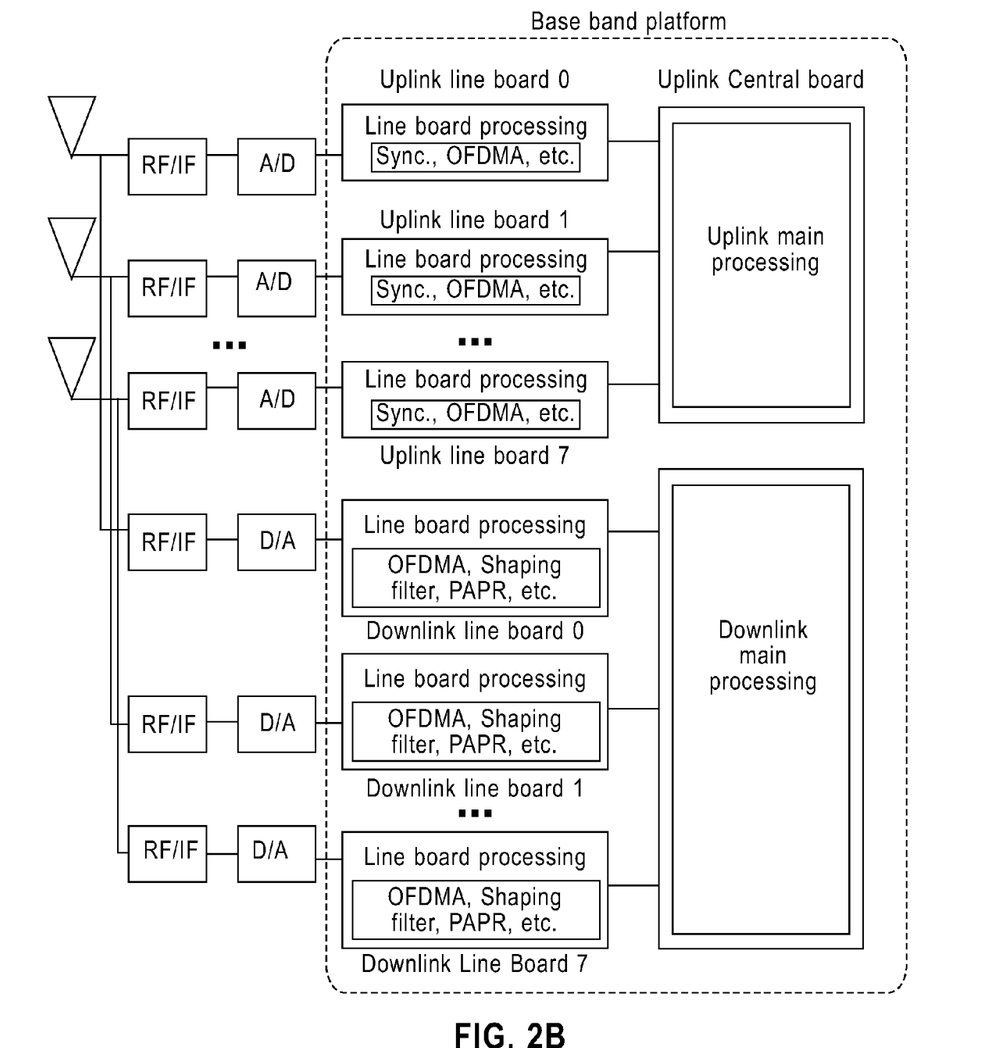

As shown in FIG. 2(b), when the antenna array includes eight antennas, i.e., antenna 0 to 7, not all shown, changes of the base band processing platform in hardware design must be carried out with respect to the increase in the number of antennas. Specifically, uplink sub-channel hardware modules and downlink sub-channel hardware modules, i.e., uplink sub-channel hardware modules 2 to 7 and downlink sub-channel hardware modules 2 to 7 need to be added to the base band processing platform for antennas 2 to 7. Then, the data of the added sub-channel hardware modules need to be collected into the central line boards for processing. Thus, it can be seen that for antenna arrays of different sizes, the base band processing platform needs to be re-designed and changed to correspond to the changes in the antenna arrays.

Therefore, to fulfill the required flexibility and scalability in base band processing of base stations, it will be required that the base band processing system must be able to be scaled and to have the flexibility for different sizes of antenna arrays. However, with respect to the traditional base station with proprietary architecture design, or with respect to new base station designs based on general IT servers, the scalability of antenna arrays cannot be supported using today's technology.

SUMMARY OF THE INVENTION

In order to improve the flexibility and scalability of the base band processing systems of base stations, there are provided: a base station adaptive for antenna arrays, a radio frequency header module, a transceiving apparatus, and a data processing system for the base station, and methods of receiving and sending data for the base station.

According to an aspect of the present invention, there is provided a base station apparatus adaptive for antenna arrays. The base station includes:

at least one radio frequency (RF) header module;
at least one data processing apparatus; and
transceiving apparatus for transceiving data between the at least one radio frequency (RF) header module and the at least one data processing apparatus;

The transceiving apparatus includes:

an uplink module to group data received by the at least one RF header module according to grouping configuration information, and transfer the grouped data to the at least one data processing apparatus; and
a downlink module to degroup the data from the at least one data processing apparatus according to the grouping configuration information, and transfer the degrouped data to the at least one RF header module.

The at least one data processing apparatus includes:

at least one uplink sub-channel processing module to process the uplink data of one sub-channel;
a data distributor to distribute grouped data to the at least one uplink sub-channel processing module;
at least one downlink sub-channel processing module to process the downlink data of one sub-channel; and
a data converger to merge the data from each of the at least one downlink sub-channel processing modules.

The at least one radio frequency (RF) header module includes:

at least one antenna and RF channel corresponding to the antenna.

According to another aspect of the present invention, there is provided a method of receiving data for a base station. The method includes:

receiving the data by an at least one radio frequency (RF) header module;
grouping the data received by at least one radio frequency (RF) header module according to grouping configuration information;
transferring the grouped data to at least one data processing apparatus; and
distributing the grouped data in each of the at least one data processing apparatus into at least one uplink sub-channel according to the data channel from which the data is received.

According to yet another aspect of the present invention, there is provided a method of sending data for a base station. The method includes:

merging the data of at least one downlink sub-channel in each of at least one data processing apparatus;
transferring the merged data from the at least one data processing apparatus to a transceiving apparatus;
degrouping the merged data from the at least one data processing apparatus according to grouping configuration information; and
sending the merged data by an at least one radio frequency (RF) header module.

According to still another aspect of the present invention, there is provided a computer readable article of manufacture tangibly embodying computer readable instructions for executing a computer implemented method of sending data for a base station. The method includes:

merging the data of at least one downlink sub-channel in each of at least one data processing apparatus;
transferring the merged data from the at least one data processing apparatus to a transceiving apparatus;
degrouping the merged data from the at least one data processing apparatus according to grouping configuration information;
sending the merged data by an at least one radio frequency (RF) header module.

In each aspect of the present invention, by grouping the data from antenna arrays according to the grouping configuration information, transmitting the grouped data to the corresponding processing apparatus, and distributing the data into corresponding sub-channels for processing, the base band processing system can be adaptive for antenna arrays with different sizes and different standards, thus remarkably improving the flexibility of the base station processing system.

DETAILED DESCRIPTION OF THE PREFERRED EMBODIMENTS

Various embodiments of the present invention are described below in combination with the figures.

Figure 3A:
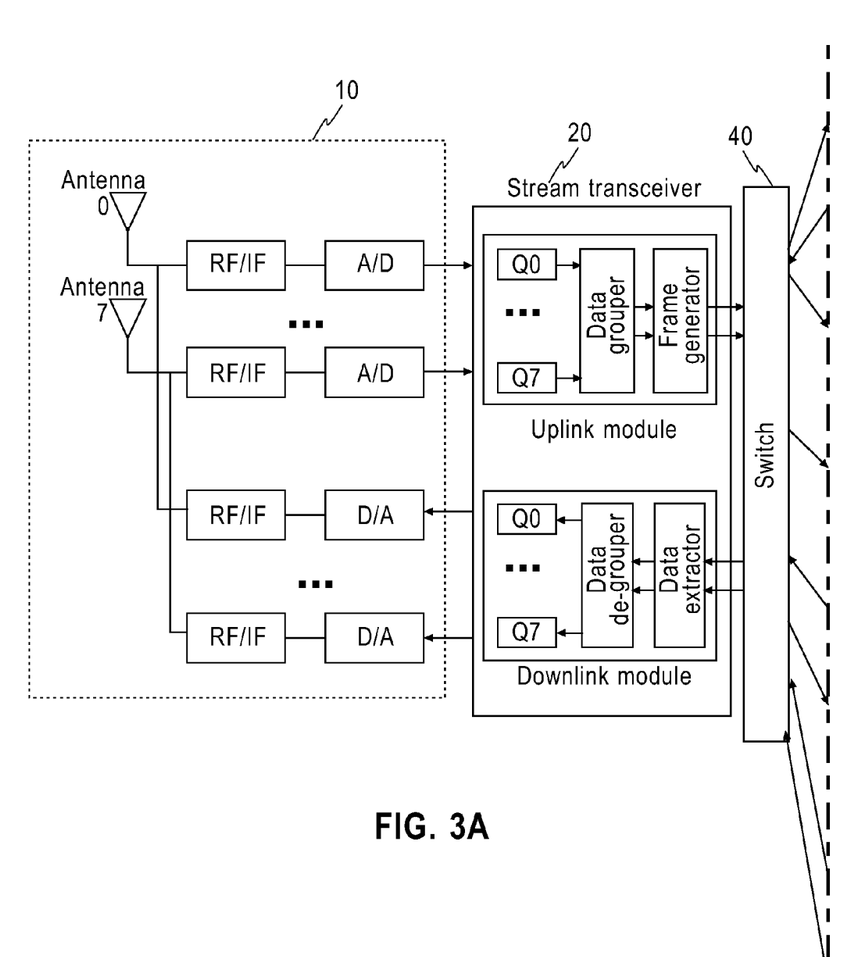
FIG. 3 illustrates the architecture of a communication base station according to an embodiment of the present invention.
Figure 3B:
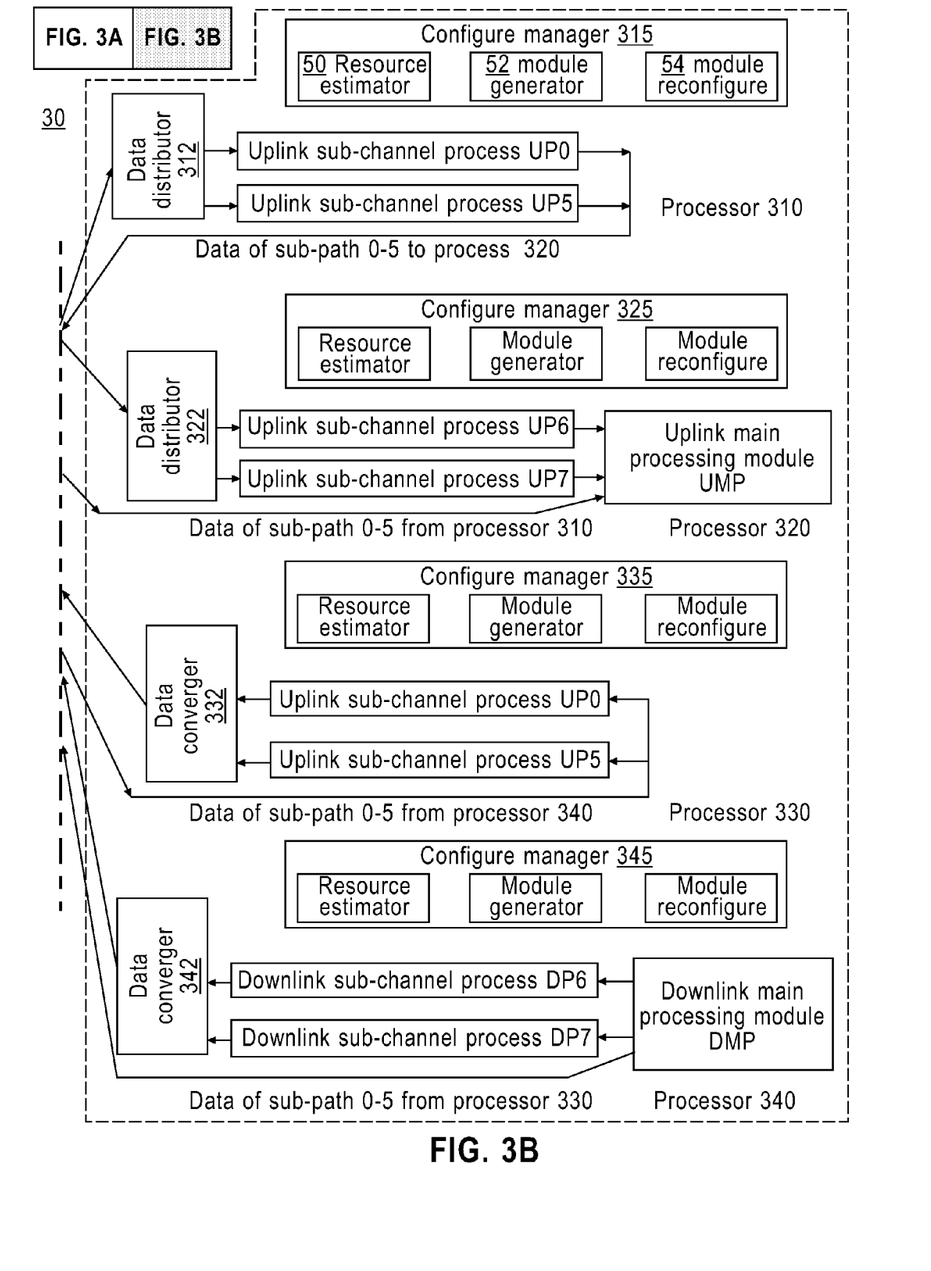

FIG. 3 illustrates the architecture of a base station according to an embodiment of the present invention. As shown in the figure, the base station of FIG. 3 includes an RF header system 10, a transceiving apparatus 20, a switch module 40 and a data processing system 30. In the base station, the RF header system 10 is provided to receive uplink data signal from communication terminals and transmit the data to the transceiving apparatus 20; and to acquire processed downlink data from the transceiving apparatus 20 and transmit the data to the communication terminals. The transceiving apparatus 20 is linked between the RF header system 10 and the data processing system 30, to acquire uplink data from the RF header system 10, group the uplink data according to grouping configuration information and transmit the grouped data to the data processing system 30; and to acquire processed downlink data from the data processing system 30, and degroup the downlink data and transmit the degrouped data to the RF header system 10. The switch module 40 is provided to switch data between the transceiving apparatus 20 and the data processing system 30 and inside the data processing system 30. The data processing system 30 is provided to perform base band processing to the uplink data acquired from the transceiving apparatus 20 according to the grouping configuration information, and to transmit the processed downlink data to the transceiving apparatus 20 after the base band processing.

In the present embodiment, the RF header system 10 includes 8 RF header modules, marked by 0 to 7. Only antennas 0 and 7 are shown. Each RF header module includes an antenna and a data channel corresponding to the antenna. Specifically, the RF header module 0 includes the antenna 0 and an uplink analog channel and a downlink analog channel corresponding to the antenna. The uplink analog channel includes an RF/IF module that converts the RF radio frequency signals received from the antenna into IF intermediate frequency signals, and an analog-to-digital converter A/D that converts analog signals into digital signals. The downlink analog channel includes a digital-to-analog converter D/A that converts digital signals into analog signals, and an RF/IF module that converts intermediate frequency analog signals into radio frequency signals to be sent through antennas. Other RF header modules 1 to 7 include respective antennas 1 to 7 and corresponding analog channels. The number of antennas can be adjusted according to requirements, e.g., m antennas 0 to m−1 can be set.

Figure 4:
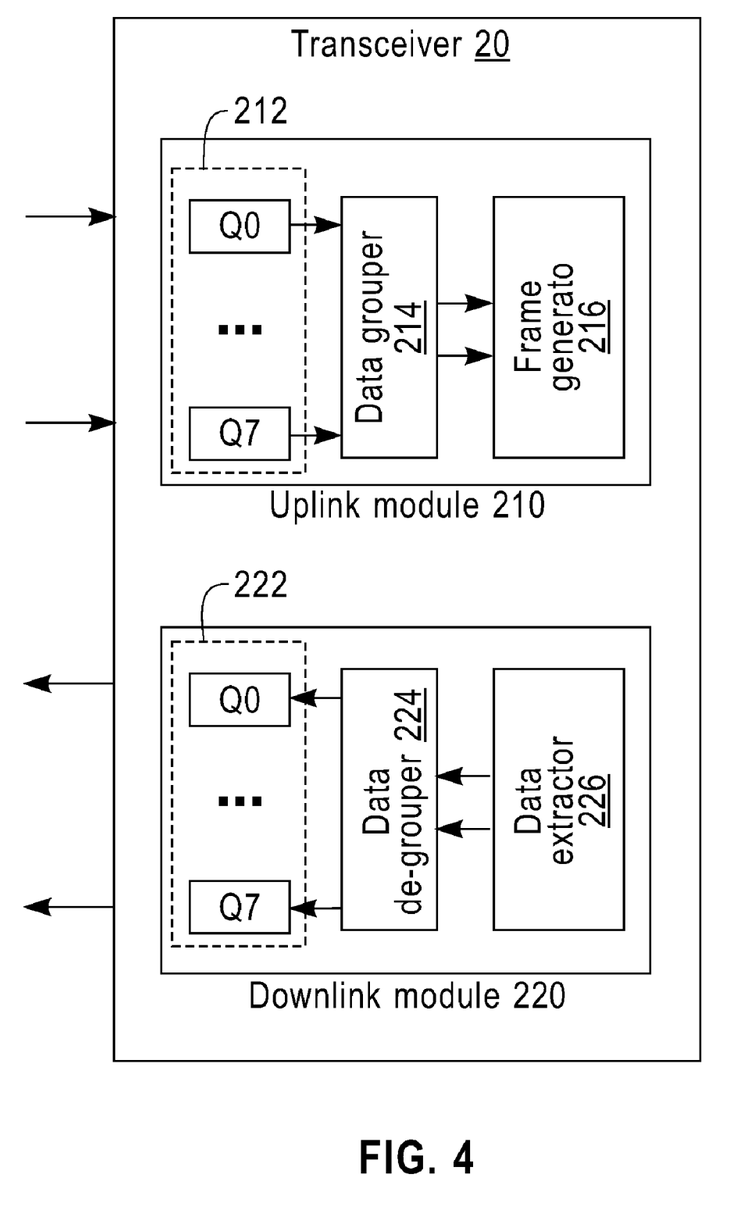
FIG. 4 illustrates the structure of the transceiving apparatus 20 of FIG. 3.

FIG. 4 illustrates the structure of the transceiving apparatus 20 of FIG. 3. As shown in the figure, the transceiving apparatus 20 includes an uplink module 210 and a downlink module 220, where the uplink module 210 is provided to acquire uplink data from the RF header system 10, group the uplink data according to the grouping configuration information, and transmit the grouped data to the data processing system 30; the downlink module 220 is provided to acquire processed downlink data from the data processing system 30, degroup the downlink data, and transmit the degrouped data to the RF header system 10. The uplink module 210 further includes an uplink data queue module 212, a data grouper 214 and a frame generator 216.

The uplink data queue module 212 includes a plurality of uplink data queues Q0, Q1, to Q7, where the number of queues corresponds to the number of data channels of incoming data. In the present embodiment, the number of uplink data queues corresponds to the number of data channels in the RF header system, i.e., the number of antennas. Since the antennas receive RF signals in real time from the terminals, the signals need to be buffered first in order to be processed. These data queues corresponding to the data channels provide buffering for the data in the corresponding channels. Specifically, the data queues can be implemented through the memory cells in the transceiving apparatus. The number of the queues and the memory they take can be preset in the transceiving apparatus, or can be automatically set or changed through external grouping configuration information, where the external grouping configuration information can come from the data processing system 30.

The data grouper 214 is provided as a hardware module in the transceiving apparatus to group the incoming data. Specifically, in this embodiment the data grouper 214 groups the incoming data from each data queues Q0 to Q7 according to the grouping configuration information which relies on the needed computation resource and the available resource of each processing apparatus in the data processing system 30, the needed computation resource in turn relies on the number of antennas and the algorithms used. In one embodiment, the grouping configuration information is manually set and input to the transceiving apparatus. In another embodiment, the grouping configuration information is automatically generated by the data processing system 30, and dynamically input to the transceiving apparatus. Further, the data grouper 214 adds synchronization flags into each grouped data stream, and adds path ID into the stream according to the corresponding data channel through which it flows, for the identification of the data of each data channel in future processing. In the embodiment shown in FIG. 3, the data grouper 214 groups the data from Q0 to Q7 into two groups according to the grouping configuration information from the data processing system 30, with one group containing data from Q0 to Q5, and the other group containing data from Q6 and Q7. Specifically, grouping labels can be added into the grouped data. For example, label G1 is added into the data in queues Q0 to Q5, showing that they belong to the first group; label G2 is added into the data in queues Q6 and Q7, showing that they belong to the second group. The grouping conditions can be different according to the differences in the data queues and in the grouping configuration information.

Further, the grouped data flows into the frame generator 216. As another configurable hardware module in the transceiving apparatus 20, the frame generator 216 is provided for encapsulating every group of incoming data. Specifically, the frame generator 216 encapsulates every group of data from the data grouper 214 into the frame conforming to a standard, e.g., Ethernet, InfiniBand, so that they can be received and processed by a universal processing apparatus through the switch module 40.

The downlink module 220 further includes a data extractor 226, a data de-grouper 224 and a downlink data queue module 222. The data extractor 226 performs the reverse of the frame generator 216 in the uplink module 210. It deencapsulates the frames of data and extracts the grouped data. Specifically, the data extractor 226 deencapsulates the frames of the data coming from the data processing system through the switch module 40, according to the applied standard, e.g., Ethernet, Infiniband, and extracts grouped data from them.

Data de-grouper 224 performs the reverse of the data grouper 216 in the uplink module. It de-groups the downlink data according to the grouping of the uplink data by data grouper 214. Specifically, the data de-grouper 224 receives downlink data from the data extractor 226, synchronizes each group of data according to the synchronization flags of each group of data, and distributes the data into outgoing queues according to the path IDs marked in the data stream.

The downlink data queue module 222 includes a plurality of downlink data queues Q0, Q1 to Q7, with the number of queues corresponding to the number of data channels, i.e., the number of antennas. These downlink data queues act as buffers for the data in corresponding channels in order to send the data to the RF header system. Corresponding to the uplink queues, the number of downlink queues and the memory they take can be manually preset in the transceiving apparatus, or can be automatically set and changed according to the grouping configuration information.

In order to realize the functions of the above the modules, the transceiving apparatus 20 can be implemented with programmable chipsets, e.g., a digital signal processor (DSP), a field-programmable gate array (FPGA), or an application-specific integrated circuit (ASIC). The modules in the transceiving apparatus 20 can be implemented with independent or integrated chips in the programmable chipset.

Returning to FIG. 3, the switch module 40 is linked between the transceiving apparatus 20 and the data processing system 30 for switching data between the transceiving apparatus 20 and the data processing system 30 and inside the data processing system 30. Specifically, for uplink data, the switch module 40 maps each group of data into its corresponding processing apparatus in the data processing system 30 according to the data grouping conditions by the transceiving apparatus 20. In this embodiment, the transceiving apparatus 20 groups the uplink data into two groups. The switch module 40 routes the first group of data to the first processing apparatus 310 in the data processing system 30, and routes the second group of data to the other processing apparatus 320.

For downlink data, the switch module 40 converges, or merges, the downlink data coming from different processing apparatus and transmits the data to the transceiving apparatus 20. Further, the switch module 40 also switches data between different processing apparatuses in the data processing system 30 when data transmission and switching between them is needed. Data communication between the switch module 40 and the data processing system 30 can be implemented through various protocols and standards, e.g., Ethernet or Infiniband.

After acquiring uplink data from the transceiving apparatus 20 through the switch module 40, the data processing system 30 carries out base band processing of the acquired uplink data according to the grouping configuration information, and transmits the downlink data after base band processing to the transceiving apparatus 20 through the switch module 40. As shown in the figure, the data processing system 30 includes multiple data processing apparatus, i.e., processing apparatus 310, 320, 330 and 340. Each processing apparatus is a universal processing apparatus that can be independent, possibly using independently running line boards, PCs or servers, or can be implemented by at least one blade in a blade server, as long as the processing apparatus can independently carry out universal computations and can interconnect to carry out collaborated computation.

The processing apparatus 310 includes a data distributer 312 and a plurality of uplink sub-channel processing modules UP0 to UP5. The data distributer 312 receives stream data from the transceiving apparatus 20 through the switch module 40, and distributes the data into corresponding uplink sub-channel processing modules according to the path IDs of the stream data. In the present embodiment, the data distributer 312 receives the data corresponding to antennas 0 to 5 and further corresponding to queues Q0 to Q5 from the transceiving apparatus 20 through the switch module 40, and distributes the data into uplink sub-channel processing modules UP0 to UP5 according to the path IDs of the data. The uplink sub-channel processing modules UP0 to UP5 are provided to perform sub-channel processing for the uplink data in each sub-channel. In the present embodiment, the processing performed in uplink sub-channel processing modules is related to the standards, algorithms, and other characteristics used by the system, e.g., synchronization processing, or Orthogonal Frequency-Division Multiple Access (OFDMA) processing.

The processing apparatus 320 includes a data distributer 322, uplink sub-channel processing modules UP6 to UP7, and an uplink main processing module UMP. The data distributer 322 receives the data corresponding to antennas 6 and 7, and further corresponding to queues Q6 and Q7 from the transceiving apparatus 20 through the switch module 40, and distributes the data into corresponding uplink sub-channel processing modules UP6 and UP7 according to the path IDs of the data. The uplink sub-channel processing module UP6 and UP7 perform sub-channel processing for the uplink data distributed to them. The uplink main processing module UMP is provided to perform main processing for the uplink data. In the present embodiment, the data coming from the uplink sub-channel processing modules UP0 to UP5 in the processing apparatus 310 is transmitted into the processing apparatus 320 through the switch module 40, and flows into the main processing module UMP together with the data from the uplink sub-channel processing module UP6 and UP7 for uplink main processing which includes spatial filtering, STBC, space-time block coding, channel estimation, demodulation and decoding.

Similarly, the processing apparatus 330 includes a data converger 332 and downlink sub-channel processing modules DP0 to DP5. The downlink sub-channel processing modules DP0 to DP5 perform downlink sub-channel processing for the downlink data, including OFDMA, Orthogonal Frequency-Division Multiple Access, and shaping filtering. The data converger 332 is provided to converge, or merge, the data in each of the downlink sub-channel processing modules DP0 to DP5, and transmit the data to the transceiving apparatus 20 through the switch module 40.

The processing apparatus 340 includes a data converger 342, downlink sub-channel processing modules DP6 and DP7, and a downlink main processing module DMP. The data converger 342 is provided to converge the data processed by the downlink sub-channel processing modules DP6 and DP7. The downlink main processing module DMP is provided to perform downlink main processing on the downlink data. The downlink main processing includes beamforming, modulation and coding. In the present embodiment, the downlink main processing module DMP performs downlink main processing for data in all the data channels. Then, the data in two of the data channels are treated with downlink sub-channel processing in the downlink sub-channel processing modules DP6 and DP7 in the processing apparatus 340, converged by the data converger 342 and transmitted to the transceiving apparatus 20 through the switch module 40. The data in the other data channels are transmitted to the processing apparatus 330 through the switch module 40, treated with downlink sub-channel processing in the downlink sub-channels processing modules DP0 to DP5 of the processing apparatus 330, converged by the data converger 332 and then transmitted to the transceiving apparatus 20 through the switch module 40.

The data distributers, data convergers, uplink sub-channel processing modules, downlink sub-channel processing modules, uplink main processing module and downlink main processing module are all implemented by the software modules in the processing apparatus.

It can be seen that the distribution of the uplink and downlink sub-channel processing modules among different processing apparatus corresponds to the grouping of data by the transceiving apparatus 20. Specifically, the transceiving apparatus 20 groups the data queues Q0 to Q7 into two groups according to the grouping configuration information; data in Q0 to Q5 is in the first group, and data in Q6 and Q7 is in the second group. The data in the first group are transmitted to the processing apparatus 310 and processed with uplink sub-channel processing in the corresponding uplink sub-channel processing modules UP0 to UP5. The data in the second group are transmitted to the processing apparatus 320, and respectively treated with sub-channel processing in the corresponding sub-channel processing modules UP6 and UP7.

Similarly, the downlink data are also grouped into two groups, each being treated with sub-channel processing in corresponding downlink sub-channel processing modules in processing apparatuses 330 and 340. Thus, it can be seen that the distribution of uplink and downlink sub-channel processing modules corresponds to the grouping of data, and further relies on the grouping configuration information.

As described above, the grouping configuration information relies on the computation resource needed and the available resource of each processing apparatus in the data processing system 30; the computation resource needed further relies on the number of antennas and algorithms. In one embodiment, the grouping configuration information is preset, i.e., the grouping to be performed and the loading of corresponding software modules in the processing apparatus according to the grouping are decided in advance. In another embodiment, the grouping configuration information is computed by an external computation apparatus, not shown, according to the resource needed and the available resource of each processing apparatus, and is transmitted to the transceiving apparatus 20 and the data processing system 30.

In the embodiment shown in the figure, the grouping configuration information is automatically generated by the data processing system 30, and dynamically input to the transceiving apparatus 20. At the same time, the sub-channel processing modules in the data processing system 30 are also distributed and configured through the grouping configuration information.

In the present embodiment, the processing apparatus 310 further includes a configure manager 315. The configure manager 315 is implemented by software modules to generate the grouping configuration information, and to generate, configure, and manage other modules in the processing apparatus. Specifically, the configure manager 315 includes a resource estimator 50, a module generator 52 and a module reconfigurer 54. The resource estimator 50 is provided to estimate the needed computation resource and the available resource in each processing apparatus, and to accordingly generate the grouping configuration information. The module generator 52 is provided to generate needed modules in the processing apparatus according to the grouping configuration information generated by the resource estimator 50. The module reconfigurer, or module configure, 54 is provided to configure the parameters of the modules in the processing apparatus. Other processing apparatus 320, 330, 340 each include their configure managers 325, 335 and 345, respectively. When the data processing system 30 includes a plurality of configure managers, one of them, e.g., the configure manager 315 can be set as the main configure manager.

Specifically, in the present embodiment, the resource estimator 50 in the configure manager 315 estimates the computation resource needed for processing the data transmitted by the antennas according to the number of antennas, i.e., antennas 0 to 7, and the standards and algorithms the antennas are based on, and estimates the available computation resource in each processing apparatus according to the performance, resource occupation status and the like of the processing apparatus. Based on the estimation of the needed and available resource, it is found that in the case of the present embodiment, both the uplink and downlink data need to be divided into two groups. The data corresponding to antennas 0 to 5 is in one group, and the data corresponding to antennas 6 and 7 is in the other group. The two groups of uplink data and two groups of downlink data need to be processed respectively in four processing apparatus. Such grouping configuration information is transmitted to the transceiving apparatus 20 as its basis for grouping the data.

According to the grouping configuration information, the module generator 52 generates uplink sub-channel processing modules UP0 to UP5 in the processing apparatus 310 corresponding to the first group of uplink data, and generates a data distributer 312 to distribute the uplink data into these uplink sub-channel processing modules. The main configure manager 315 informs other configure managers 325, 335, and 345 of the configure management information, enabling the module generators in these configure managers to generate needed modules in their respective processing apparatus according to the configure management information. The communication between the configure managers can be implemented through various protocols and interfaces, e.g., Ethernet interface protocol, CPU BUS interface, and PCI interface.

The module reconfigurer 54 is provided to configure the parameters of the generated modules. Specifically, in the uplink and downlink main processing modules, many algorithms and parameters, e.g., special filter and beamforming algorithms for smart antennas, STBC coding algorithm for MIMO antennas, are sensitive to the size of antenna arrays. Consequently, the parameters and data structure of these algorithms related to the antenna arrays should be configured according to the information of the antennas in the RF header system.

As can be seen from the descriptions above, by using the configure manager, it is possible to automatically calculate the needed resource and available resource and thus acquire the grouping configuration information, and to generate the needed modules in each of the processing apparatus according to the grouping configuration information. It is thereby possible to achieve a proper distribution and configuration of the modules among the processing apparatus and to further improve the flexibility of the system.

In the base station shown in FIG. 3, the transceiving apparatus 20 is placed between the RF header system 10 and the data processing system 30 as an independent hardware component. However, the transceiving apparatus 20 can also be integrated into the RF header system to act as a new RF header system. Or the transceiving apparatus 20 can be integrated into the data processing system to act as a new data processing system. Also, the switch module 40 can also be integrated with the transceiving apparatus 20.

Figure 5:
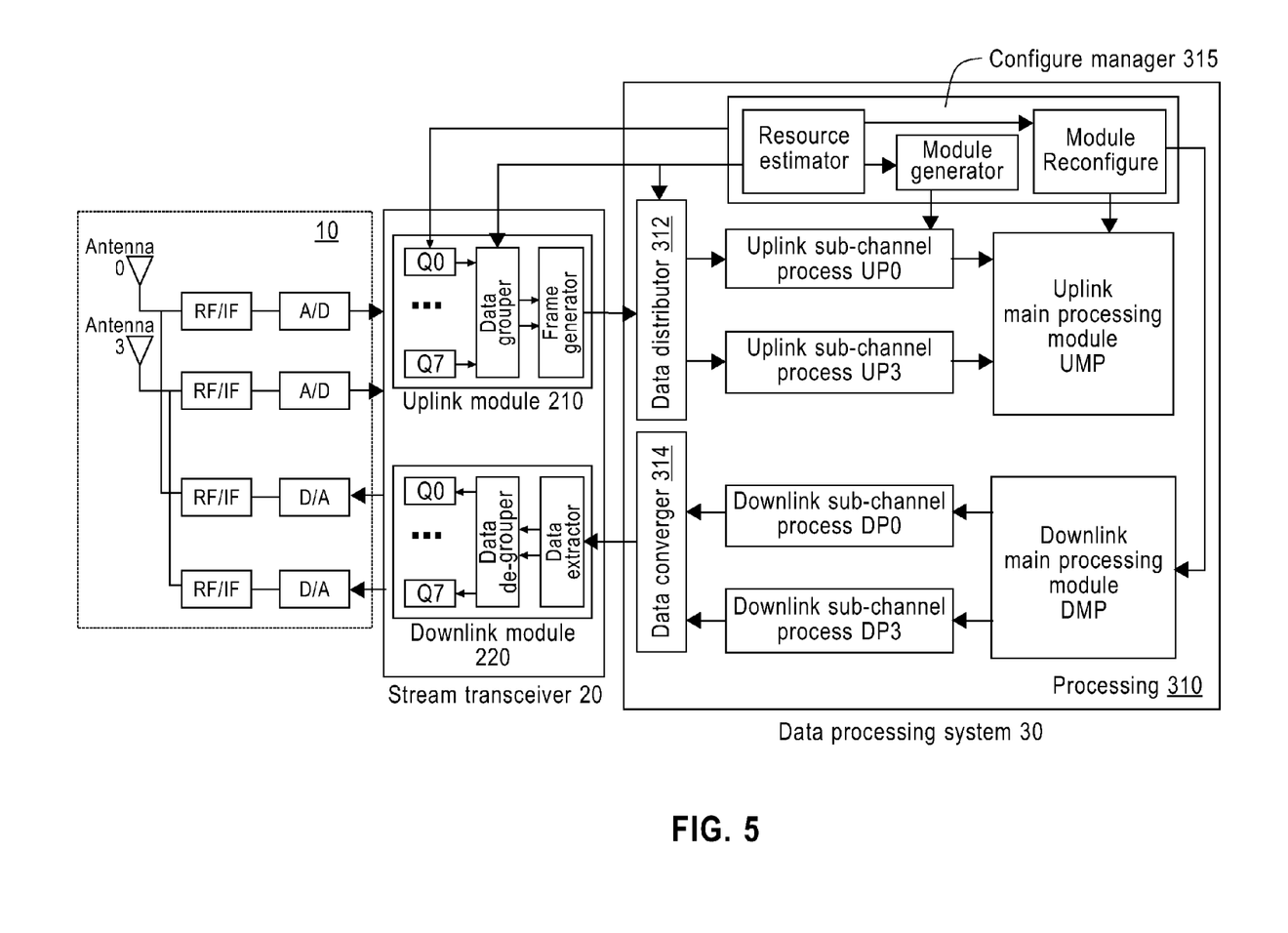
FIG. 5 illustrates the architecture of a communication base station according to another embodiment of the present invention.

FIG. 5 illustrates the architecture of a base station according to another embodiment of the present invention. In FIG. 5, the modules and apparatus similar to those in FIG. 3 are indicated by the same numbers. As shown in FIG. 5, the base station includes an RF header system 10, a transceiving apparatus 20, and a data processing system 30. Among them, the RF header system includes 4 antennas marked by 0 to 3 and the corresponding data channels. The transceiving apparatus 20 is identical with that in FIG. 4. However, according to the grouping configuration information, the transceiving apparatus 20 groups the incoming data into only one group, i.e., the data in all the data channels are transmitted into the same processing apparatus or processor 310, in the data processing system 30. The data processing system 30 uses only one processing apparatus 310 to perform base band processing.

The processing apparatus 310 includes a data distributer 312, uplink sub-channel processing modules UP0 to UP3, an uplink main processing module UMP, a data converger 314, downlink sub-channel processing modules DP0 to DP3, and a downlink main processing module DMP. The functions of these modules are the same as those of the corresponding modules in FIG. 3, but in the present embodiment, according to the grouping configuration information, they are allocated into the same processing apparatus 310. As described above, the grouping configuration information can be preset, externally computed, or automatically generated by the data processing system. In the present embodiment, the grouping configuration information is generated by the configure manager 315 in the processing apparatus 310. The configure manager 315 is the same as that in FIG. 3 in structure, function, and implementation.

When only one processing apparatus is employed, the switch module 40 in FIG. 3 is not needed for data switching. The transceiving apparatus 20 directly communicates with the processing apparatus 310 in the data processing system.

Figure 6:
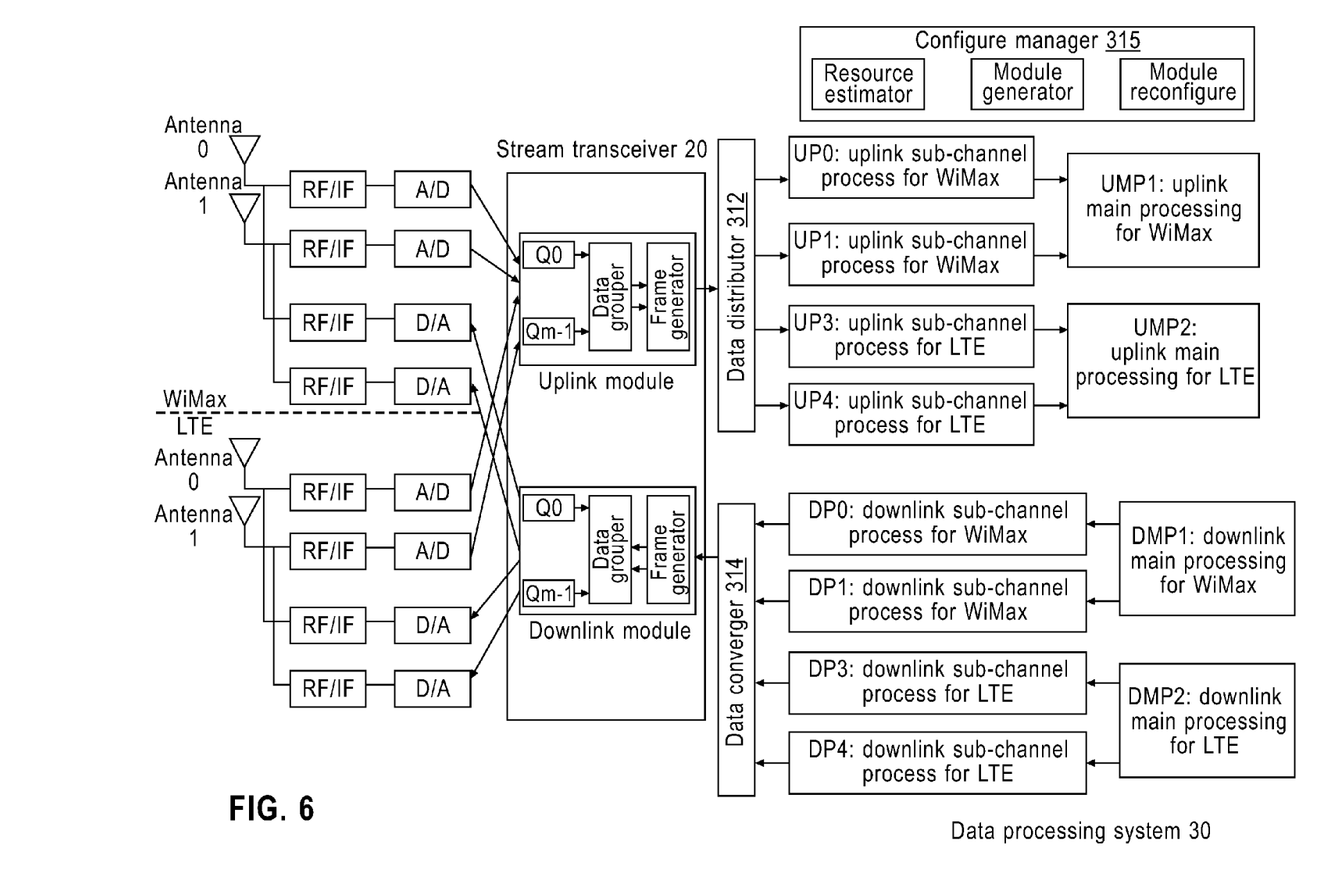
FIG. 6 illustrates the architecture of a communication base station according to yet another embodiment of the present invention.

FIG. 6 illustrates the architecture of a base station according to another embodiment of the present invention. This base station also includes an RF header system 10, a transceiving apparatus 20 and a data processing system 30. Among them, the RF header system 10 includes 4 antennas, where the antennas 0 and 1 belong to array 1, supporting Worldwide Interoperability for Microwave Access (WiMax); and antennas 2 and 3 belong to array 2, supporting the Long Term Evolution (LTE) standard. For such multiple communication standards or multi-standard antenna arrays, when the transceiving apparatus 20 performs grouping of the data in each data channel according to the grouping configuration information, not only does it need to add channel ID (or path ID) to the data channels, but it also needs to add the ID of the antenna array from which the data comes. In the present embodiment, according to the grouping configuration information, data in all the data channels are put into one group, and processed by a single processing apparatus, similar to processor 310 of FIG. 5, in the data processing system 30.

In order to accommodate multi-standard antenna arrays, according to the grouping configuration information, the processing apparatus includes a data distributer 312, uplink sub-channel processing modules UP0 to UP3, uplink main processing modules UMP1 and UMP2, a data converger 314, downlink sub-channel processing modules DP0 to DP3, and downlink main processing modules DMP2 and DMP2. Among them, the uplink sub-channel processing modules UP0 and UP1 are provided to perform uplink sub-channel processing for WiMax for the data from antennas 0 and 1, and UP2 and UP3 are provided to perform uplink sub-channel processing for LTE for the data from antennas 2 and 3. According to the array IDs marked in the data sub-channels, the data after uplink sub-channel processing flow respectively into the uplink main processing modules UMP1 and UMP2 for main processing. The uplink main processing module UMP1 is configured to execute the uplink main processing for WiMax, and the uplink main processing module UMP2 is configured to execute the uplink main processing for LTE. The downlink sub-channel processing modules DP0 to DP3 and the downlink main processing modules DMP1 and DMP2 are configured corresponding to the uplink processing configurations.

Further, in the present embodiment, the grouping configuration information can also be generated by the configure manager 315 in the processing apparatus. The structure, function and implementation of the configure manager 315 are similar to those described above.

It can be seen from the embodiments described above that, through the grouping of the data from antenna arrays according to the grouping configuration information, transmitting the grouped data to the corresponding processing apparatuses, and distributing the data to the corresponding sub-channels for processing, the base band processing system can be adaptive for antenna arrays with different sizes and executing different standards, without re-designing the hardware. Instead, the base band processing system only needs to distribute and configure the needed software modules according to the grouping configuration information. By setting the configure manager in the processing system, the base band processing system can automatically generate the grouping configuration information, and thus more flexibly accommodate the changes in antenna arrays. Those skilled in the art can understand that the embodiments described above have many modifications. According to the grouping configuration information, the transceiving apparatus can perform various groupings of the data, and also, there are various module distributing schemes in the data processing system.

For example, with the increasing size of the antenna arrays, the data can be grouped into ten groups or dozens of groups or more. Thus, dozens or more processing apparatus might otherwise be needed in the data processing system for base band processing. Some of the processing apparatus can perform only the distribution and uplink sub-channel processing for some of the data, some can only perform uplink main processing, and some can simultaneously perform multiple processing. Thus, the present invention is not limited to the embodiments described above in detail, but can be extended to all the modifications that are possible for those skilled in the art under the teaching of the present description.

Figure 7:
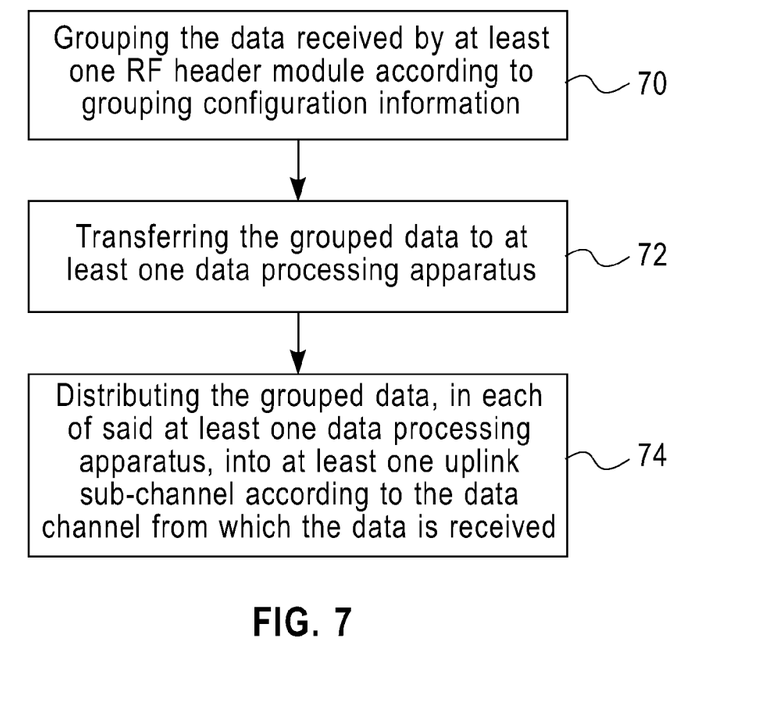
FIG. 7 illustrates the flow chart of a method of receiving data for a base station according to an embodiment of the present invention.

FIG. 7 illustrates the flow chart for the method of receiving data for a base station. As shown in the figure, first, in step 70, grouping is performed for the data received by at least one RF header module according to the grouping configuration information, which relies on the needed computation resource and the resource available in the system. In an embodiment, the grouping configuration information is preset. In another embodiment, the grouping configuration information is automatically generated by the base band processing system of the base station. More specifically, a configuration managing apparatus in the base band processing system is provided to estimate the needed resource and resource available in the system, and generate the grouping configuration information according to the estimation result. Further, the step of grouping the data received by at least one RF header module includes: buffering the received data corresponding to the data channels in the RF header module, grouping the buffered data according to the grouping configuration information; and encapsulating the grouped data.

Then in step 72, the grouped data is transmitted to at least one data processing apparatus. Specifically, in one embodiment, the data are put into one group, and directly transmitted to a data processing apparatus. In another embodiment, the data are grouped into a plurality of groups, and transmitted to a plurality of data processing apparatus through a switching apparatus, each of the plurality of data processing apparatus receiving one of the plurality of groups of data.

Then, proceeding to step 74, in each of the at least one data processing apparatus, the grouped data are distributed into at least one uplink sub-channel according to the data channel of the received data. Specifically, in one embodiment, in each of the data processing apparatus that receives grouped data, a data distributer is provided to distribute the grouped data into at least one uplink sub-channel processing module, according to the data channel of the data, for uplink sub-channel processing.

Figure 8:
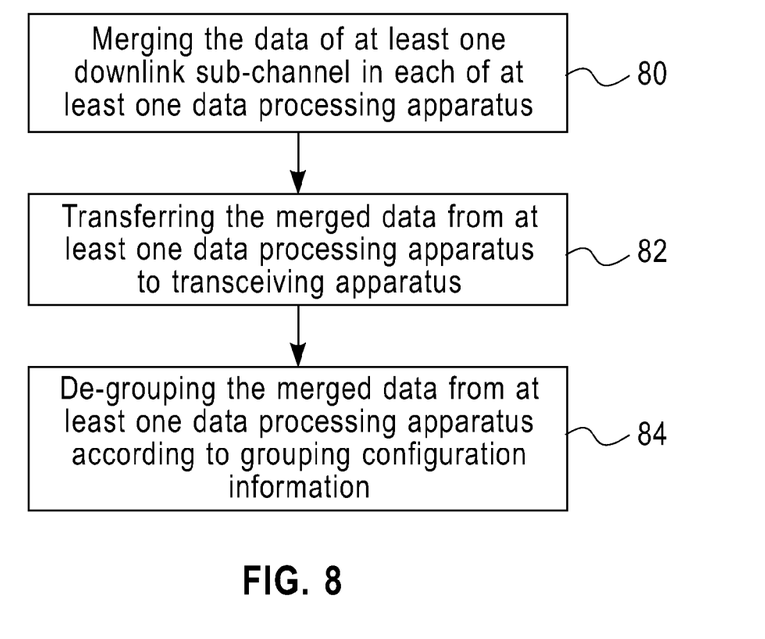
FIG. 8 illustrates the flow chart of a method of sending data for a base station according to an embodiment of the present invention.

Corresponding to the method of receiving data for a base station, also provided in the present invention is a method of sending data for the base station. FIG. 8 illustrates a flow chart of the method of sending data for the base station according to an embodiment of the present invention. As shown in the figure, first in step 80, in each of at least one data processing apparatus, data in at least one downlink sub-channel is converged. Specifically, in one embodiment, in each of the processing apparatuses that performs downlink sub-channel processing, the data in each downlink sub-channel is converged by a data converger. When the data is converged, the path ID of each sub-path is retained for future identification.

Then, in step 82, the converged data from at least one data processing apparatus is transferred to the transceiving apparatus. Specifically, in one embodiment, the data in each data channel is processed for downlink sub-path processing in one processing apparatus, and directly transferred to the transceiving apparatus after being converged. In another embodiment, multiple groups of data are processed for downlink sub-path processing in multiple data processing apparatus, and transferred to the transceiving apparatus through a switching apparatus after being converged in each data processing apparatus.

Then, advancing to step 84, in the transceiving apparatus the converged data from at least one data processing apparatus are degrouped according to the grouping configuration information. Further, the step of degrouping data includes: deencapsulating the data, extracting the grouped data; degrouping the data according to the grouping configuration information; and buffering the degrouped data corresponding to the respective data sub-channel. Further, buffered data is finally transmitted to at least one RF header module. Those skilled in the art can understand that, the software modules and methods can be implemented by computer executable commands and/or by being included in the controlling codes of the processing apparatus.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A base station apparatus with antenna arrays comprising: at least one radio frequency (RF) header module; at least one data processing apparatus; and a transceiving apparatus for transceiving data between the at least one radio frequency (RF) header module and the at least one data processing apparatus; wherein the at least one radio frequency (RF) header module comprises: at least one antenna and RF channel corresponding to the antenna; wherein the transceiving apparatus comprises: an uplink module to group data received by the at least one RF header module according to grouping configuration information, and transfer the grouped data to the at least one data processing apparatus; and a downlink module to degroup the data from the at least one data processing apparatus according to the grouping configuration information, and transfer the degrouped data to the at least one RF header module; and wherein the at least one data processing apparatus comprises: at least one uplink sub-channel processing module to process the uplink data of one sub-channel; a data distributor to distribute grouped data to the at least one uplink sub- channel processing module; at least one downlink sub-channel processing module to process the downlink data of one sub-channel; and a data converger to merge the data from each of the at least one downlink sub-channel processing modules.

2. The transceiving apparatus according to claim 1, wherein the uplink module comprises:
    an uplink data queue module having a number of queues wherein the number of queues corresponds to the number of the at least one sub-channel of incoming data and wherein each queue is configured to buffer the data from a corresponding data sub-channel;
    a data grouper configured to group the buffered data according to the grouping configuration information; and
    a frame generator for encapsulating the grouped data in frames.

3. The transceiving apparatus according to claim 1, wherein the downlink module comprises:
    a data extractor configured to deencapsulate frames and extract the grouped data;
    a data de-grouper configured to degroup the data according to the grouping configuration information; and
    a downlink data queue module having a number of queues wherein the number of queues corresponds to the number of the at least one sub-channel of incoming data and wherein each queue is configured to buffer the degrouped data from a corresponding data sub-channel.

4. The transceiving apparatus according to claim 1, wherein the transceiving apparatus comprises a programmable chipset.

5. The transceiving apparatus according to claim 4, wherein the programmable chipset comprises at least one of a digital signal processor (DSP), a field-programmable gate array (FPGA), and an application-specific integrated circuit (ASIC).

6. The data processing apparatus according to claim 1, further comprising at least one uplink main processing module to process the uplink data of the at least one sub-channel.

7. The data processing apparatus according to claim 1, further comprising at least one downlink main processing module to process the downlink data of the at least one sub-channel.

8. The data processing apparatus according to claim 1, further comprising a configure manager to generate grouping configuration information and generate and configure at least one module required in the data processing apparatus according to the grouping configuration information.

9. The data processing apparatus according to claim 8, wherein the configure manager comprises:
    a resource estimator to estimate the required computation resource and the available resource in the data processing apparatus, and to generate the grouping configuration information;
    a module generator to generate at least one required module in the data processing apparatus according to the grouping configuration information generated by the resource estimator; and
    a module reconfigurer to configure the parameters for the at least one required module generated in the data processing apparatus.

10. The data processing apparatus according to claim 1, wherein the data processing apparatus comprises at least one blade in a blade server.

11. The base station according to claim 1, further comprising:
    a switch module to switch data between the transceiving apparatus and the data processing apparatus and to switch data within the data processing apparatus.

12. The base station according to claim 1, wherein the base station is a multiple communications standard apparatus.

13. The base station according to claim 12, wherein the multiple communications standards comprise the Worldwide Interoperability for Microwave Access (WiMax) standard and the Long Term Evolution (LTE) standard.

* * * * *